US006961194B2

(12) United States Patent
Penn

(10) Patent No.: US 6,961,194 B2
(45) Date of Patent: Nov. 1, 2005

(54) INTEGRATED TIR PRISM AND LENS ELEMENT

(75) Inventor: Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 162 days.

(21) Appl. No.: 10/035,906

(22) Filed: Dec. 31, 2001

(65) Prior Publication Data

US 2003/0123162 A1 Jul. 3, 2003

(51) Int. Cl.[7] ............................................. G02B 5/04
(52) U.S. Cl. ..................... 359/833; 359/837; 359/709
(58) Field of Search ............................... 359/833, 837, 359/583, 589, 486, 492, 709, 710; 348/743, 348/771, 756; 369/112.19

(56) References Cited

U.S. PATENT DOCUMENTS

| 5,303,322 A | * | 4/1994 | Winston et al. ............. 385/146 |
| 5,327,413 A | * | 7/1994 | Fritz ..................... 369/112.19 |
| 5,552,922 A |   | 9/1996 | Magarill |
| 5,604,624 A |   | 2/1997 | Magarill |
| 5,629,808 A | * | 5/1997 | Powell ........................ 359/719 |
| 5,675,401 A | * | 10/1997 | Wangler et al. ............... 355/67 |
| 5,905,545 A | * | 5/1999 | Poradish et al. ............ 348/743 |
| 6,185,051 B1 | * | 2/2001 | Chen et al. ................. 359/709 |
| 6,452,662 B2 | * | 9/2002 | Mulkens et al. .............. 355/67 |

* cited by examiner

Primary Examiner—Drew A. Dunn
Assistant Examiner—Mark Consilvio
(74) Attorney, Agent, or Firm—Charles A. Brill; Wade James Brady, III; Frederick J. Telecky, Jr.

(57) ABSTRACT

Disclosed is an optical component, which comprises a prism element adjacent to a lens element, where the two elements are separated by a small air gap. In disclosed embodiments, the elements have adjacent and parallel surfaces which are substantially planar and which, with the small air gap, operate through Total Internal Reflection ("TIR") to direct light beams that strike the planar surfaces. Light beams that strike at less than the critical angle are internally reflected, while light beams which strike at greater than the critical angle pass through. The TIR surfaces thereby separate the desired optical signals from the spurious ones. The combined TIR prism lens operates as a single and integrated component which directs desired light beams to a reflective optical processing element such as a Spatial Light Modulator and which focuses the processed light beams as they leave the combined TIR prism lens.

5 Claims, 4 Drawing Sheets

INTEGRATED TIR PRISM AND LENS ELEMENT

TECHNICAL FIELD

Reflective optical systems with angular separation of illumination path and reflection path.

BACKGROUND

In systems that employ a reflective optical device for the processing of light there is typically a path through which the illumination light beam travels and a path through which the reflective light beam travels. These respective paths are referred to as the illumination path and the reflection path. When lenses or other optical elements are positioned to receive the reflective light beam, these elements must be arranged relative to the illumination path so that they do not interfere with the incoming illumination beam. For example, in an optical projection system, a Total Internal Reflection ("TIR") prism may be used to separate the illumination path from the reflection path. The reflection path would be referred to in this embodiment as a "projection path." The TIR prism may formed of two prism elements adjacent to each other, with a small air gap between them.

In one embodiment, the illumination beam is reflected at the air gap of the TIR prism using TIR reflection and is thereby directed towards the reflective optical device, which may be, for example, a Spatial Light Modulator ("SLM"), which modulates the illumination light and provides a modulated, reflected light beam that may carry an image, data, or other signal modulated on the light beam. This modulated, reflected beam is directed at a high incident angle such that it passes through the TIR surface of the TIR prism and through the air gap therein. If the light beam hits the TIR surface at less than the critical angle, it is reflected. This principle is used to reflect away the unwanted light components, such as from off-state pixels of the SLM or from other structures and surfaces of the SLM or other optical components in the system that are reflecting the light at angles outside of the desired projection angle. The light that passes straight through the TIR prism after reflection by the SLM remains on the reflection or projection path, and is typically passed through a lens or through other optical elements. The lens or other optical elements may, for example, project the light beams onto a display surface or direct them to other lenses or other optical elements.

One projection system is the Digital Light Processing ("DLP") projection system manufactured by Texas Instruments for use by display and projector manufacturers. The optical processing elements in the DLP projection systems are referred to as Digital Micromirror Devices ("DMD"), and they comprise hundreds or thousands of individual reflective pixel elements which, depending on electrostatic forces placed on the individual pixel elements, reflect the illumination light on to the projection path or to a separate "off-state" path. The aforementioned TIR reflection surface is used to reflect off these off-state light reflections, as well as to reflect away light beams originating from extraneous surfaces such as the DMD supporting structures, glass windows, prisms or flat-state pixels, which are pixels not deflected at the ideal reflection angles. Once the desired light beams have been directed to the projection path, they are typically received by a lens, which focuses the beams either on to a projector or subsequent optical elements in the projection path.

SUMMARY

Embodiments described in this patent application show the use of a combined TIR element or TIR prism and a lens, which can be combined to reduce the number of optical components in the system, reduce optical path length, and thereby increase ease of manufacturing and reduce costs. In approaches described herein, prisms are mounted to lens elements with a small air gap between them to form a combined TIR lens element. The air gap which separates the adjoining, parallel plane faces of the two sub-elements of the combined TIR lens element—the TIR element and the lens element—is on the order of 1 mm and generally within the range of a few wavelengths to 2–3 mm.

The combined TIR lens element comprising a TIR prism element and a lens element performs the functions of: (a) separating the illumination beam from the reflection or projection beam; (b) separating the off-state, flat-state, and spuriously scattered light beams from the intended reflection or projection beam after they are reflected from the SLM; and (c) optical manipulation of the beam. Using the approaches described in this specification, the elements that perform these disparate functions can be integrated into a single combined element, which is described herein as a combined TIR lens element. In a given application, it is not necessary that all these functions be performed by the combined TIR lens element, as the embodiments described herein can be employed to accomplish some or all of the described functions.

Using approaches described in this specification, it is possible for the lens sub-element of the combined TIR lens element to direct an illumination beam onto an SLM without first relying on a TIR reflection to reflect the beam onto the SLM. Alternatively, the illumination beam may enter the combined TIR lens element from a side angle (i.e., roughly parallel to the face of the SLM) and then rely on TIR reflection for its direction to the SLM surface. The embodiments described in this specification employ a combined TIR lens element both to separate either the illumination and projection light bundles or the projection and off-state light bundles from each other and to focus or "power" the reflected or projection light beam. Although, this specification refers primarily to optical processing in the context of a projection system, it could also be employed in data communications applications, for instance, which use reflective optical light switching or in other types of optical data or image processing, switches, or transmission. Still other optical processing applications can gainfully use the techniques and structures described in this specification. These other approaches are encompassed within the scope of the claims set forth in this application, and the scope of the claims should not be limited to the specific light projection embodiments described in the detailed description of the embodiments.

DESCRIPTION OF THE EMBODIMENTS

Figure 1:
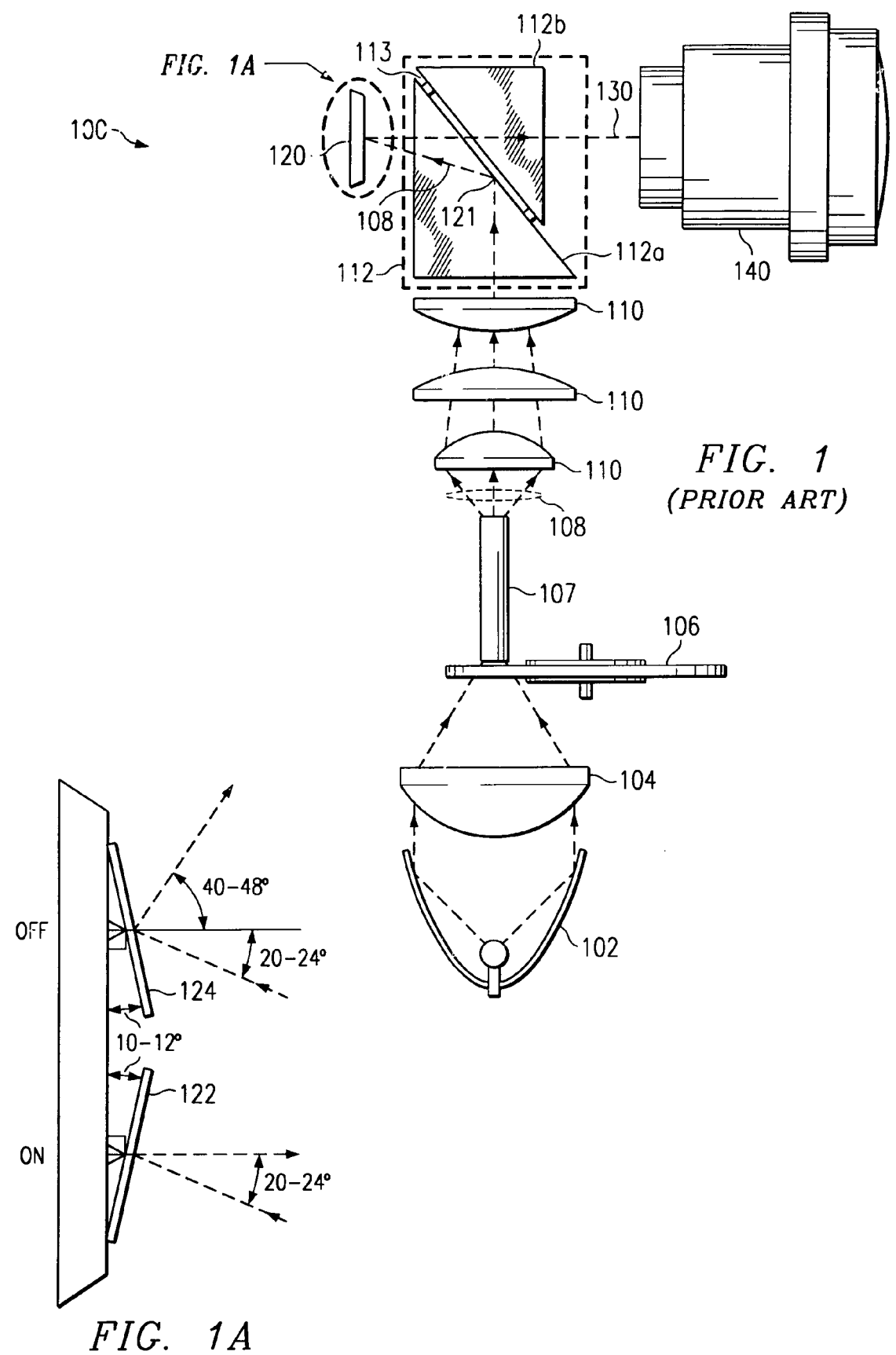
FIG. 1 is a drawing of a prior art optical projection system which uses spatially separated elements for TIR reflection and lens powering.

FIG. 1 shows a prior art optical projection system 100. Shown in FIG. 1 is a light source 102, which provides a white light for the projection system. Also shown is a lens 104, which focuses the light for passage through a color wheel 106 . The color wheel 106 spins and alternatively filters the white light into its red, green, and blue components. By synchronizing the operation of a Spatial Light Modulator ("SLM") 120, which is the active element in the projector path, with the rotation of the three colors of the color wheel 104, it is possible to project a full-color image from the system. In essence, the image would be a quickly alternating set of red, green, and blue images, but the flickering of the images are at a speed faster than the human eye is able to resolve, and accordingly the eye will "average" the colors and see a full-color image.

After passing through the color wheel 106, the light continues on the illumination path 108 through a lens 110. The lens 110 is typically a group of lenses and mirrors which together focus and direct light from the light source 102 into the TIR prism unit 112. In the embodiment shown, the TIR prism unit 112 is comprised of two TIR prism elements 112a–b, which are separated by a small air gap 113. The differing index of refraction between the prism elements 112a–b and the air in the air gap 113 causes light striking at less than a critical angle at the prism-to-air-gap surface to be reflected according to principles of Total Internal Reflection ("TIR"). In the embodiment shown in FIG. 1, the illumination path 108 is directed toward the SLM 120 or other reflecting element by a TIR reflection at point 121.

The SLM 120 receives the light beam along the illumination path 108 and reflects it onto the reflection or projection path 130. In one embodiment, the SLM 120 is a Digital Micromirror Device ("DMD"), which is an array of micromirrors that are is fabricated on a semiconductor substrate. These micromirrors are controlled through the application of electrostatic forces from underlying electrical control circuitry, which serves to pivot the micromirrors into "on" or "off" positions as is shown in FIG. 1A illustrating "on" pixel 122 and "off" pixel 124. The underlying electrical control circuitry is typically fabricated in or on the surface of the semiconductor substrate using standard integrated circuit process flows. This circuitry typically includes, but is not limited to, a memory cell associated with and typically underlying each mirror and digital logic circuit to store the frame of digital image data or other information to be optically transmitted through modulation of the SLM pixels.

Typically, as shown in FIG. 1A, the micromirrors will pivot 10–12 degrees in one direction for the mirrors' "off" state and 10–12 degrees in the other direction for the mirrors' "on" state (see pixels 124 and 122, respectively). Thus, in an approach where the principal rays from the micromirror device 120 are reflected at a normal angle to the surface of the device, the approach angle of the incoming light signal from the TIR reflection will be two times the pivot angle, or between 20 and 24 degrees from normal. The TIR surface is preferable arranged to allow the reflected beam, which is on the reflection or projection path 130 to pass directly through, in a direction that is approximately normal (at a right angle) to the face of the DMD or other SLM 120. The "off" pixels will leave the surface of the DMD 120 at an angle of 40 to 48 degrees, which comes from the original 20 to 24 degree approach added to the 20 to 24 degree of rotation from an "on" state pixel to an "off" state pixel. The TIR surface of the TIR prism element 112a is preferably configured to reflect away, using TIR, these "off-state" beams from the reflection or projection path 130 so the beams do not interfere with the desired image projection or optical data reflection. The TIR prism unit 112 is also preferably arranged to reflect away the "flat state" reflections off of the SLM, which are the reflections from the various SLM surfaces and support structures, as well as, for instance, reflections from micromirror pixels which may be in transition and not at their fully on or fully off positions.

Provided in the reflection or projection path 130 is a lens 140, which for illustration purposes is shown as a single lens, although it could be a group of lenses. The lens 140 might be a projection lens that focuses images on a display screen, or it could be another type of optical lens for manipulating the optical signal for transmission through, for example, an optical communication system.

There are several challenges posed by the use of the prior-art system of FIG. 1. One challenge is to separate the illumination path and the reflection/projection paths so that the optical elements (such as the projection lens 140) do not interfere with the light beams on the illumination path. In the system shown in FIG. 1, this separation is accomplished by sending the incoming illumination light bundles along an illumination path 108 that is essentially parallel to the surface of the SLM 120 and by then reflecting the beam using the TIR surface of the TIR prism unit 112. Another challenge is to make the total assembly 100 as small as possible. Another challenge is to manufacture the system as efficiently as possible and using the least expensive assembly of components.

Figure 2:
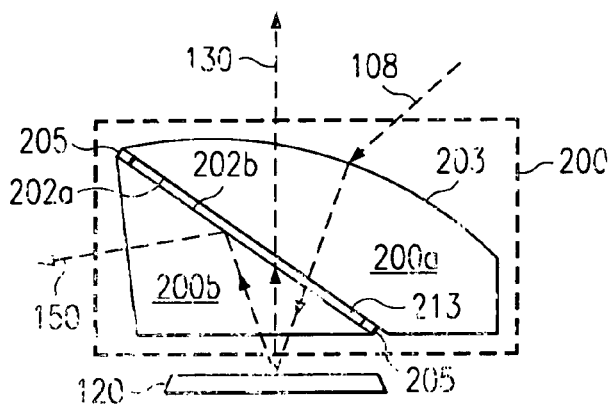
FIG. 2 is a drawing of an embodiment that uses a combined TIR lens element that comprises a TIR prism and a lens in a telecentric projection application.

FIG. 2 is a drawing of a combined TIR lens element 200 that comprises a lens element 200a and a TIR prism element 200b in a telecentric image projection application. This combined TIR lens element 200 could be used, for example, in the application of FIG. 1, as a replacement element for both the TIR prism unit 112 and the lens 140. In this embodiment, rather than using a TIR prism unit to direct the illumination path 108 onto the SLM 120, the curved face 202a of the lens element 200a is used to bend the relatively shallow-approaching illumination beam into a steeper angle of incidence to the SLM 120. The shallow approach angle also facilitates the placement of optical elements in the reflection/projection path 130 and closer to the reflective element 120 without those optical elements interfering with the illumination beam 108. As before, the SLM 120 modulates the illumination beam with image information (for display) or other optical data information (e.g., for data communication). As shown in FIG. 2, the main beam in this embodiment is reflected approximately normally from the surface of the SLM 120 and has an incident angle to the TIR surface 202b of the TIR prism element 200b that is greater than the critical angle for that surface. In a communication system in which the SLM element 120 is used as an optical router or switch, the off-state beam would ideally be reflected using TIR reflection to a defined alternate signal path 150. In a system in which all off-state light bundles are spurious, such as in a projection system, then the alternate signal path 150 would be directed away from the system and in some instances to a structure that is operable to absorb the light energy in a way that protects the optical components. In either type of system, the lens surface 203 of the lens element 200a can be used to focus or otherwise manipulate the reflected/projection light beam 130 as it exits the combined TIR lens element 200. The combination of these functions in a single integrated element allows optical system designers to design more compact and cheaper optical systems.

The combined TIR lens element 200 may be formed by joining two optical pieces together, one piece forming the lens element 200a and the other forming the TIR prism element 200b. The pieces are separated to form the air gap 213 through the use of spacers 205. Alternatively, the combined TIR lens element 200 may be formed by taking a single optical piece and forming the air gap 213 as a slit in that single piece, where the air gap slit 213 separates the lens element 200a of the piece from the TIR prism element 200b. These same assembly and/or manufacturing techniques can also be used in the embodiments described below. Other means of manufacturing combined TIR lens elements according to this or other embodiments are also possible.

Figure 3:
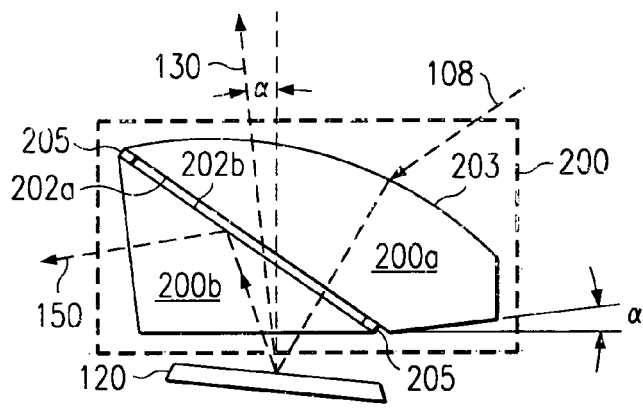
FIG. 3 is a drawing of an embodiment that uses a combined TIR lens element that comprises a TIR prism and a lens in a non-telecentric projection application.

FIG. 3 is a diagram of a system which is essentially similar to the system of FIG. 2, but which applies the combined TIR lens element 200 in a non-telecentric application. In this approach, the reflection/projection beam 130 does not reflect from the SLM surface at an angle normal to the surface, but instead reflects away at an angle α relative to normal. Operating the system in this non-telecentric configuration allows for a greater angular separation between the illumination path 108 and the reflection/projection path 130. To operate the system in this configuration, the TIR surface 202b is oriented such that, as with the telecentric configuration, the primary ray from the SLM surface hits the TIR surface at greater than the critical angle and thereby passes through the TIR surface 202b and on out through the lens element 200b. The lens element 200b is designed to focus or otherwise manipulate the reflective/projection light bundles. As with FIG. 2, this design results in improved compactness of the system, as well as in an improved component and assembly cost.

Figure 4:
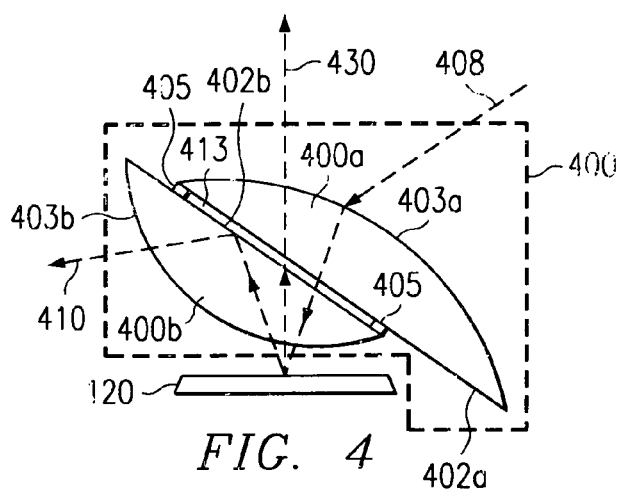
FIG. 4 is a drawing of a combined TIR lens element that employs two lenses having adjacent planar faces that act as TIR surfaces and also have convex lens surfaces in an application that uses the focal surfaces of the lenses to direct an illumination beam to a reflecting element.

FIG. 4 is a drawing of a combined TIR lens element 400 that is formed of two lenses 400a–b having adjacent planar faces 402a–b, separated by an air gap 413, which act as TIR surfaces. As with the embodiments of FIGS. 2–3, this structure may be configured for use in either telecentric or non-telecentric applications by proper design and alignment of the optical elements in the system. The lens elements 400a–b also have convex lens surfaces 403a–b that focus or otherwise manipulate the light beams passing through the lenses. The use of the second lens 400b, rather than a TIR prism element, allows for two identical components to be used to form the combined TIR lens element 400, rather than two distinct piece parts (i.e. the TIR prism element and the lens element). The use of identical components is optional, and allows for a more efficient procurement of components for the final assembly. Non-identical lenses could also be used in certain embodiments.

Figure 5:
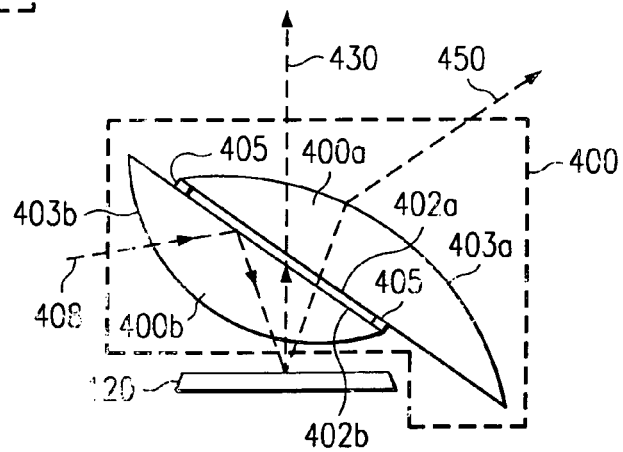
FIG. 5 is a drawing of a combined TIR lens element that employs two lenses having adjacent planar faces that act as TIR surfaces and also have convex lens surfaces in an application which uses TIR reflection from a planar surface of a lens to direct an illumination light beam to a reflecting element.

FIG. 5 is a drawing of an embodiment that essentially uses the same type of combined TIR lens element 400 as was used in FIG. 4. As in FIG. 4, these lenses have adjacent planar faces 402a–b, which act as TIR surfaces and also have convex lens surfaces 403a–b. In this embodiment, however, the illumination path 408 approaches the combined TIR lens element 400 from the side. As in the FIG. 3 embodiment, a TIR reflection is used to direct the light beam over the illumination path 408 onto the SLM 120. The lens surfaces (403a–b) of both lenses 400a–b can again be used to focus or otherwise manipulate the light beams as they exit and re-enter the combined TIR lens element 400 over both the illumination path 408 and the reflection or projection path 430. This embodiment can also be employed in both telecentric and non-telecentric applications, depending on whether the principal ray from the SLM 120 is reflected along the normal axis to the surface or at an off-normal angle. The focusing and alignment of the lenses will be different in the telecentric and non-telecentric applications, but the functions of the various parts of the combined TIR lens element of FIG. 5 are generally the same as described in FIG. 4.

Figure 6:
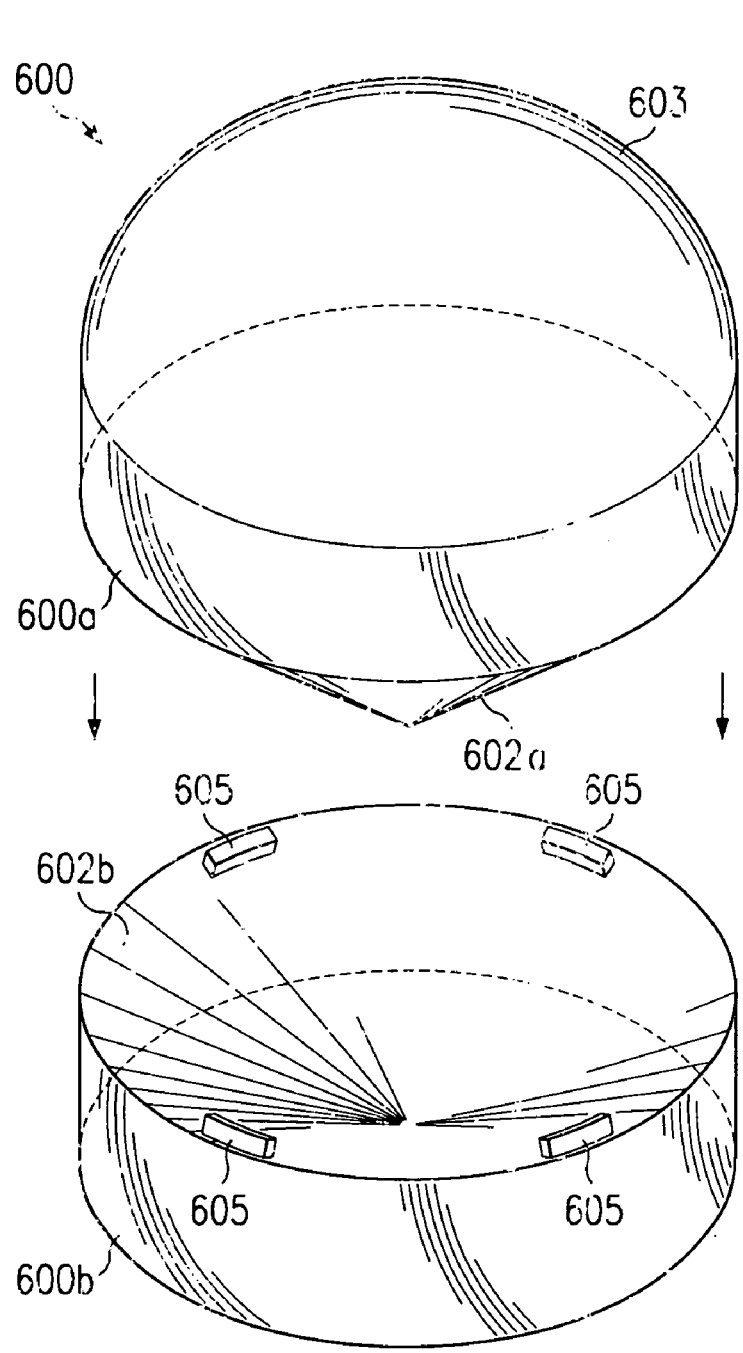
FIG. 6 is an exploded-view drawing of a three-dimensional combined TIR lens element, which comprises a TIR prism with a conical cavity and a lens with a conical outer surface that mates with the conical cavity of the TIR prism element.

FIG. 6 is an exploded view drawing of a three-dimensional combined TIR lens element 600, which comprises a lens element 600a with a conical outer surface 602a and a TIR prism element 600b with a conical cavity 602b. The conical cavity 602b mates with the conical outer surface 602a, and as with the two-dimensional applications described above, spacers 605 would ideally be used to create a small air gap (not shown, see FIG. 7) whereby there is established an index of refraction difference between the lens element and the air and the prism element and the air, and further whereby a light beam approaching the air-gap interface at less than the critical angle is totally internally reflected within the respect lens or prism in which the light beam is traveling. Both the lens element 600a and the TIR prism element 600b are generally cylindrical in shape and are circularly symmetrical about the axis of their respective cylinders.

Figure 7:
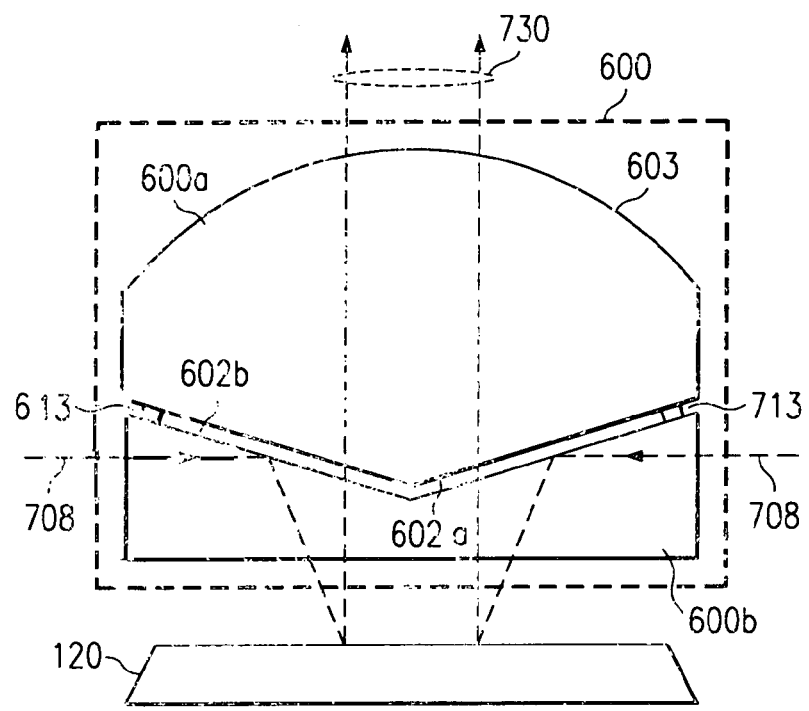
FIG. 7 is a side-view drawing of the three-dimensional combined TIR lens element of FIG. 6.

FIG. 7 is a side view drawing of the embodiment of FIG. 6. As mentioned, this approach uses a circular lens element 600a, which has a conical projection 602a opposite the lens surface 603. The lens surface 603 is, in other words, at one end of the cylindrical form of element 600a, whereas the conical projection 602a is at the other end of the cylinder. The other component of the three-dimensional combined TIR lens element 600 is a TIR prism element 600b. The TIR prism element 600b is also generally circularly symmetrical about its cylindrical axis, having a generally planar surface that is opposite to its conical indentation 602b. Because of the three-dimensional nature of this combined TIR lens element 600, approaching light bundles about a 360 degree circle relative to the cylindrical axes of these elements 600a–b can be directed toward the SLM 120 or other reflective element.

The illumination path 708, in the example of FIG. 7, is essentially a disk-shaped path over which light bundles approach the TIR surface 602b from concentric positions about the center of the lens. These light bundles are directed toward the reflective element 120 by reflection off of the TIR surface 602b. The beams are reflected, and optionally, modulated, by the SLM 120 or other reflective surface, and then proceed over reflected/projection light path 730. As before, light bundles that are reflected off of the SLM 120 or other reflective surface at angles less than the critical angle (such as, for instance, if the light is reflected from "off" pixels of the SLM) are reflected away by the TIR surface 602*b* and accordingly do not interfere with the intended reflected or projected light beams travelling on the reflective path 130.

Figure 8:
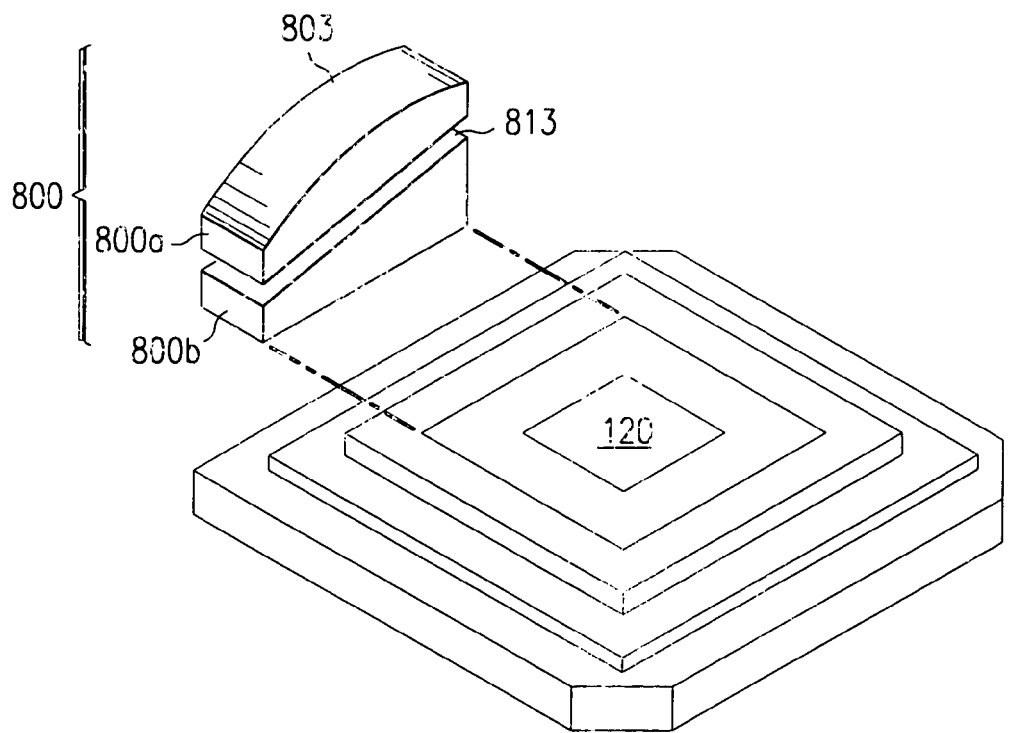
FIG. 8 is a drawing of a packaged SLM module having an integrated, combined TIR lens element.

FIG. 8 is a drawing of an integrated SLM module onto which a combined TIR lens element 800 is mounted. Integrated SLM modules are commonly sold packaged in ceramic with a clear window mounted above them through which light can pass. In the embodiment shown in FIG. 8, even further space savings can be realized in an optical system design by either mounting a combined TIR lens element 800 directly onto such a glass window or by replacing the package window with the TIR lens element itself. FIG. 8 illustrates in a partial assembly view how such an integrated SLM module including a combined TIR lens element 800 could be implemented. As described previously, the combined TIR lens element comprises a TIR lens element 800*a* and a TIR prism element 800*b*, which together serve both to direct incoming light bundles to the spatial light modulator 120 and to focus the reflected bundles as they leave the combined TIR lens element 800.

Although some of the embodiments have been described above in the two-dimensional sense, the applications described in the two-dimensional approaches could also be employed in three-dimensional applications. Such three-dimensional applications include, but are not limited to microscopes and telescopes.

Additionally, although embodiments have been described above for application in SLM projection systems, the advantages gained by use of the combined TIR lens element can be applied in many fields employing reflective optics. For example, the described embodiments could be employed for printing applications, optical communication applications, and others. The light beams described in the embodiments above are of white (full-spectrum) light, as well as beams filled from the white. The described embodiments can also be with single wavelength light beams such as generated from the laser light or multiple single wavelength beams generated from multiple lasers and/or wavelength-division multiplexers.

A few preferred embodiments have been described in detail hereinabove. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical assembly comprising:
    a first element having a generally cylindrical shape, a generally circular base, and a conical indentation within the cylindrical shape that serves as a total internal reflection element for light from the perimeter of the cylindrical shape incident the conical indentation at greater than the critical angle;
    a lens element having a surface adjacent and substantially parallel to the surface of the conical indentation of the first element, the lens element also having a curved surface for focusing light passing through said curved surface; and
    a reflective member positioned adjacent the base of the first element to reflect light from the conical indentation of the first element to the curved surface of the lens element.

2. The optical assembly of claim 1 wherein the lens element is circularly symmetrical, having a generally cylindrical shape but having a conical end which mates with the conical indentation in the first element and having a lens surface opposite the conical end.

3. The optical assembly of claim 1 wherein the end of the generally cylindrical shape of the first element that is opposite to the conical indentation is substantially planar.

4. The optical assembly of claim 1 wherein the end of the first element that is opposite to the conical indentation is substantially curved to form a lens surface.

5. The optical assembly of claim 1 wherein the reflective member is a micromirror array.

* * * * *